(12) United States Patent
Tiwana et al.

(10) Patent No.: US 8,780,904 B2
(45) Date of Patent: *Jul. 15, 2014

(54) GRACEFUL NETWORK MERGE BY PERFORMING A GRACEFUL TRANSITION OF CONFLICTING ROUTING IDENTIFIERS

(75) Inventors: Gurumukh Singh Tiwana, Cupertino, CA (US); Sanjay Sane, Fremont, CA (US); Ajay Kulhari, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/357,418

(22) Filed: Jan. 24, 2012

(65) Prior Publication Data

US 2012/0189014 A1    Jul. 26, 2012

Related U.S. Application Data

(63) Continuation of application No. 12/263,200, filed on Oct. 31, 2008, now Pat. No. 8,111,691.

(51) Int. Cl.
*H04L 12/28* (2006.01)
*H04L 29/12* (2006.01)
*H04L 12/56* (2006.01)

(52) U.S. Cl.
CPC .......... *H04L 29/12264* (2013.01); *H04L 45/00* (2013.01); *H04L 45/021* (2013.01); *H04L 61/2046* (2013.01)
USPC ............................................ 370/389; 726/15

(58) Field of Classification Search
CPC ................................................ H04L 29/12264
USPC ............................................ 370/389; 726/15
See application file for complete search history.

(56) References Cited

U.S. PATENT DOCUMENTS

| 6,118,782 | A | 9/2000 | Dixon et al. |
| 6,137,781 | A * | 10/2000 | Goto et al. ................. 370/255 |
| 2006/0085851 | A1* | 4/2006 | Heninger et al. ............. 726/15 |
| 2008/0165946 | A1* | 7/2008 | Whiting et al. .......... 379/221.01 |
| 2008/0205391 | A1* | 8/2008 | Suryaputra et al. ........... 370/389 |
| 2009/0274102 | A1 | 11/2009 | O'Neill |

OTHER PUBLICATIONS

U.S. Office Action dated Jun. 10, 2010 from U.S. Appl. No. 12/263,200.
U.S. Office Action dated Nov. 26, 2010 from U.S. Appl. No. 12/263,200.

(Continued)

*Primary Examiner* — Wei Zhao
(74) *Attorney, Agent, or Firm* — Fernando Hale & Chang LLP

(57) ABSTRACT

A first switch of a first network may receive a second set of information including routing identifiers associated with a second network, wherein the first switch of the first network is connected to a second switch of the second network. The first switch of the first network may transmit a first set of information including routing identifiers associated with the first network. The first switch may determine whether a conflict exists between the second set of information and the first set of information. A conflicting one of the routing identifiers associated with the first or second network may be transitioned to a non-conflicting routing identifier according to the determination of whether a conflict exists between the first set of information and the second set of information.

23 Claims, 6 Drawing Sheets

(56) References Cited

OTHER PUBLICATIONS

U.S. Final Office Action dated May 5, 2011 from U.S. Appl. No. 12/263,200.
U.S. Notice of Allowance dated Oct. 4, 2011 from U.S. Appl. No. 12/263,200.
Data Center Ethernet—Wikipedia http://en.wikipedia.org/wiki/Data_Center_Ethernet printed Oct. 30, 2008, 1-3 pgs.
Data Center Ethernet—Cisco Systems http://www.cisco.com/en/US/netsol/ns783/networking_solutions_package.html printed Oct. 30, 2008 1-2 pgs.

* cited by examiner

GRACEFUL NETWORK MERGE BY PERFORMING A GRACEFUL TRANSITION OF CONFLICTING ROUTING IDENTIFIERS

RELATED APPLICATIONS

This application is a continuation application and claims priority from U.S. patent application Ser. No. 12/263,200, entitled "Graceful Network Merge By Performing a Graceful Transition of Conflicting Routing Identifiers," by Tiwana et al, filed on Oct. 31, 2008, which is incorporated herein by reference for all purposes.

BACKGROUND

1. Technical Field

The present disclosure relates generally to methods and apparatus for performing a graceful merge of two or more networks.

2. Description of the Related Art

When two or more distinct networks are connected to each other, there could be conflicts between identifiers used within these networks. For instance, a switch identifier (e.g., address) that is used to identify a particular switch in one of the networks may be the same as a switch identifier that is used to identify a switch within another one of the networks. As a result, merging of these networks could result in a variety of problems resulting from the overlapping identifiers.

DESCRIPTION OF EXAMPLE EMBODIMENTS

Figure 1:
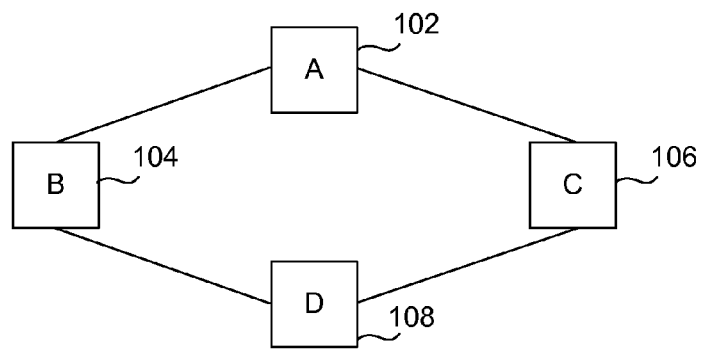
FIG. 1 is a block diagram illustrating an example network including a plurality of switches.

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, a first switch of a first network receives a second set of information including routing identifiers associated with a second network, wherein the first switch of the first network is connected to a second switch of the second network. The first switch of the first network transmits a first set of information including routing identifiers associated with the first network. The first switch determines whether a conflict exists between the second set of information and the first set of information. A conflicting one of the routing identifiers associated with the first or second network may be transitioned to a non-conflicting routing identifier according to the determination of whether a conflict exists between the first set of information and the second set of information, thereby enabling data to flow between the first network and the second network via a link between the first switch and the second switch.

Specific Example Embodiments

The disclosed embodiments enable two or more networks that have one or more overlapping identifiers to be merged without user intervention. For instance, the overlapping identifiers may include routing identifiers such as switch identifiers or forwarding tags that are uniquely associated with particular routing paths. Specifically, the disclosed embodiments resolve (e.g., change the value(s) of) the overlapping identifiers before allowing the networks to be merged.

While it is possible to instantaneously change the value of an overlapping identifier such as a switch identifier, such a change could cause the loss of packets that are in transit. In accordance with various embodiments, a conflicting routing identifier is gradually transitioned to a new, non-conflicting routing identifier. This may be accomplished seamlessly without losing any data packets in flight. Changing the value of one or more overlapping identifiers is a non-event as far as data flow is concerned. In accordance with one embodiment, the transmission of data traffic between the two merging networks is delayed until any conflicting identifiers are resolved.

In accordance with one embodiment, network devices such as switches may be identified by an identifier. While the identifiers associated with switches in a network may be unique within the network for which the switch identifiers have been assigned, these switch identifiers are not globally unique identifiers. As a result, one or more of these identifiers may also be assigned to switches of another network. Thus, when two or more distinct networks are connected to each other, there could be conflicts between these switch identifiers.

In accordance with various embodiments, before two or more networks are merged, any conflicting identifiers may be resolved. This may be accomplished by modifying an identifier of one or more of the switches having conflicting identifiers. As will be described in further detail below, the transition of identifiers may be accomplished without affecting existing traffic within the networks.

In order to illustrate the use of switch identifiers within a network, an example network is shown in FIG. 1. As shown in this example, a single network may include a plurality of switches, which are identified in this example as switches A 102, B 104, C 106, and D 108. Each of the switches may be dynamically assigned a switch identifier, which may be referred to as a primary address. Thus, within the network 100, each of the switches 102, 104, 106, 108 may be assigned identifiers (e.g., primary addresses) 1001, 1002, 1003, and 1004, respectively.

One example network in which the disclosed embodiments may be implemented is a Data Center Ethernet (DCE) network. Within a DCE network, each of the switches is identified by a switch identifier. Specifically, each switch identifier may be a 12-bit dynamically assigned address. Various allocation protocols exist to allocate a switch identifier to each switch within a network to ensure that the switch identifiers are unique within the network in which the switch is located.

Figure 2:
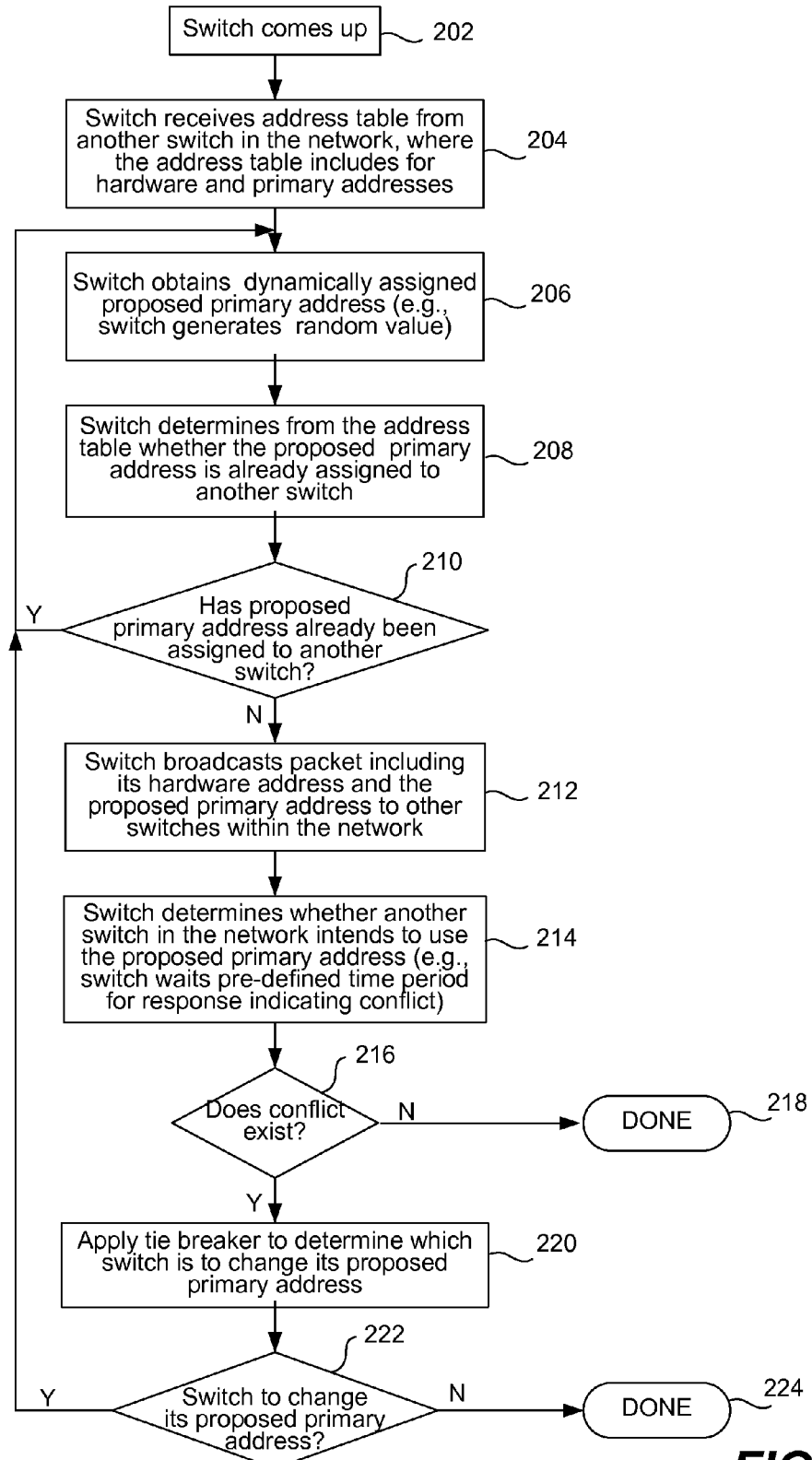
FIG. 2 is a process flow diagram illustrating an example method of performing dynamic assignment of primary addresses within a single network.

In accordance with one embodiment, primary addresses may be assigned in a distributed manner. FIG. 2 is a process flow diagram illustrating an example method of performing dynamic assignment of primary addresses within a single network. Specifically, a primary address may be assigned to a switch within a network when the switch comes up, as shown at 202. Once the switch has been powered on, the switch may receive an address table at 204 from another switch within the network. The address table may include hardware addresses and/or other routing identifiers of one or more switches in the network, as well as corresponding primary addresses of these switches. The switch may obtain a dynamically assigned proposed primary address at 206. For instance, the switch may generate the proposed primary address internally. This may be accomplished via a variety of mechanisms, such as via a random number generator. The switch may then determine from the address table at 208 whether the proposed primary address has already been assigned to another switch. If it is determined from the address table that the proposed primary address has already been assigned to another switch in the network at 210, the process may repeat at 206 for the switch to obtain a new proposed primary address. However, if it is determined that the proposed primary address has not already been assigned to another switch in the network, the switch may broadcast a packet including its hardware address and the proposed primary address to other switches within the network at 212.

While the switch has already determined that another switch in the network has not already been assigned the proposed primary address as its primary address, other switches may have dynamically generated the same proposed primary address with the intention of determining whether it may continue to use the proposed primary address as its primary address. As a result, the switch may receive a response to its broadcast packet indicating that there is a conflict. Thus, the switch may determine whether another switch in the network intends to use the proposed primary address as its primary address at 214. Specifically, the switch may wait a pre-defined period of time for any responses to its broadcast packet indicating such a conflict. During this time period, if a response is not received indicating that a conflict exists at 216, the process ends at 218 and the switch proceeds to use this proposed primary address as its primary address. The switch may proceed to send a confirmatory message to switches within the network indicating that it is now using the proposed primary address as its primary address. The switches in the network may then update their address tables with the switch's primary address.

If a response is received indicating that a conflict exists at 216, the conflict may be resolved in a variety of ways to ensure that only one of the switches continues to use the proposed primary address as its primary address. In accordance with one embodiment, the conflict between proposed primary addresses of two different switches may be resolved by applying a tie breaker at 220 to determine which of the two switches may continue to use the proposed primary address as its primary address, resulting in the other of the two switches changing its proposed primary address. If the switch wins the tie-breaker at 222, it does not need to change its proposed primary address and the process ends at 224. The switch may then proceed to use the proposed primary address as its primary address. The switch may proceed to send a confirmatory message to other switches within the network indicating that it is now using the proposed primary address as its primary address. The switches in the network may then update their address tables with the switch's primary address. If the switch determines it is the one that is to obtain a new proposed primary address at 222 (e.g., has lost the tie-breaker), the process may continue at 206 for the switch to obtain a new proposed primary address.

As described with reference to FIG. 2, primary addresses may be dynamically assigned to switches in a distributed fashion. In other words, primary addresses may be dynamically obtained by the switches within the network. Alternatively, primary addresses may dynamically assigned by a centralized entity.

Figure 3:
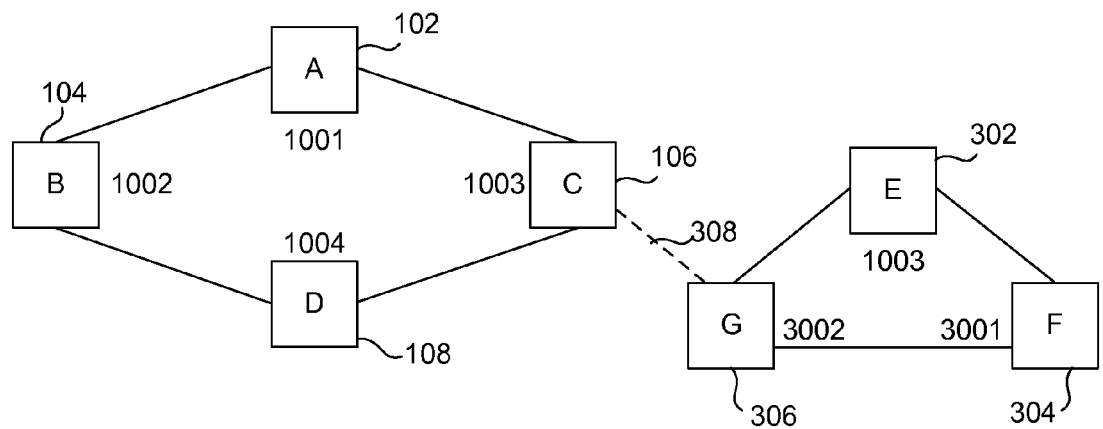
FIG. 3 is a block diagram illustrating an example of two networks that may be merged in accordance with various embodiments.

FIG. 3 is a block diagram illustrating an example of two networks that may be merged in accordance with various embodiments. As shown in this example, a second network includes switches E 302, F 304, and G 306 having corresponding primary addresses 1003, 3001, and 3002, respectively. Thus, switch E 302 of the second network has the same primary address as switch C 106 of the first network. In this example, the two networks are being merged. However, before establishing a link 308 between the first network and the second network, the disclosed embodiments ensure that conflicting primary addresses are resolved, as will be described in further detail below with reference to FIGS. 4-5.

Figure 4:
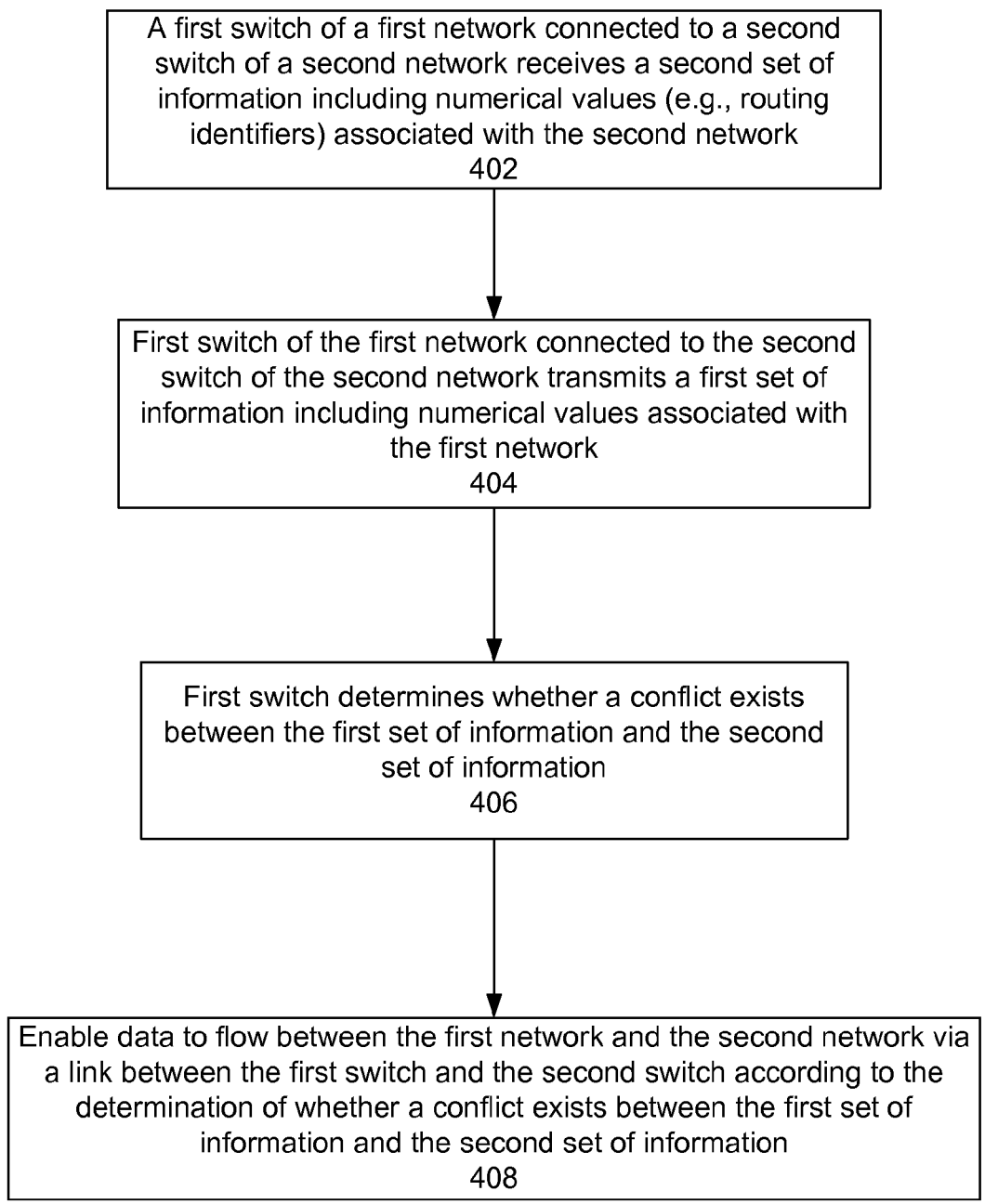
FIG. 4 is a process flow diagram illustrating an example method of resolving conflicting identifiers when two or more networks are merged.

FIG. 4 is a process flow diagram illustrating an example method of resolving conflicting identifiers when two or more networks are merged. A first switch of a first network connected to a second switch of a second network may receive a control packet including a second set of information including numerical values associated with the second network at 402. These numerical values may include routing identifiers used to route packets in the network. For example, routing identifiers may include switch identifiers (e.g., primary addresses) and/or forwarding tags that are uniquely associated with routing paths in the corresponding network. The first switch of the first network connected to the second switch of the second network may transmit a first set of information including numerical values (e.g., routing identifiers) associated with the first network (e.g., via the second switch) at 404 to the second switch of the second network. The first switch may determine whether a conflict exists between the second set of information and the first set of information including numerical values associated with the first network at 406. Specifically, a conflict may be determined to exist when one of the numerical values in the first set of information conflicts with one of the numerical values in the second set of information. Where a conflict is determined to exist (e.g., between dynamically assigned switch identifiers), this could lead to the disruption of data flow.

The first switch may then enable data to flow between the first network and the second network via a link between the first switch and the second switch according to the determination of whether a conflict exists between the first set of information and the second set of information at 408. Specifically, if a conflict has been determined to exist, the conflict may be resolved. The conflict may be resolved by identifying one of the numerical values in the first set of information that conflicts with one of the numerical values in the second set of information and modifying the identified one of the numerical values in the first set of information or the second set of information.

Modification of one of the numerical values may be accomplished by transitioning the conflicting value (e.g., primary address) in at least one of the sets of information to a new, non-conflicting value. Such a gradual transition may be performed by associating a modified value with the identified one of the numerical values and replacing the identified one of the numerical values in the first set of information with the modified value after a pre-determined period of time. When a conflict no longer exists, the first switch may set its port that is connected to the second switch to a data forwarding state to enable data to flow between the two networks. The second switch may perform a similar process to that set forth above with respect to FIG. 4, and similarly set its port that is connected to the first switch to a data forwarding state. Once both switches on either side of the link set their respective ports to a data forwarding state, data packets may flow across the networks.

In accordance with one embodiment, merging of two or more networks is allowed when the switch identifiers are unique across the entire merged network, avoiding any forwarding loops or loss of packets. This may be accomplished by providing a graceful transition from a switch identifier to a new, non-conflicting switch identifier. Transitions of switch identifiers may be performed in a manner that does not interrupt the flow of existing traffic within the networks being merged. Once the conflicts have been resolved, the networks are allowed to merge. Such a graceful network merge obviates the need for an administrative intervention.

Figure 5A:
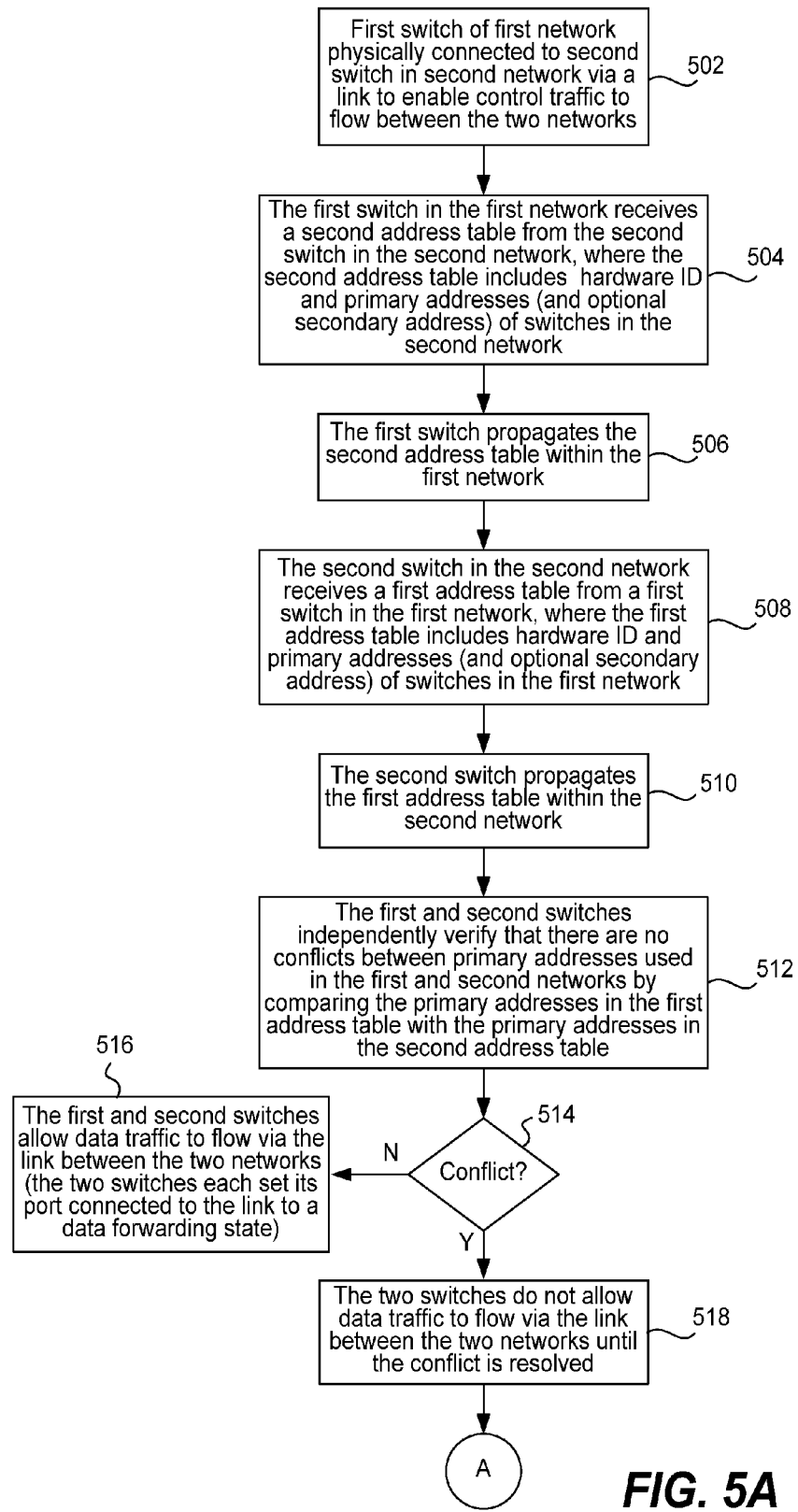
FIG. 5 is a process flow diagram illustrating an example method of merging two or more networks in accordance with various embodiments.
Figure 5B:
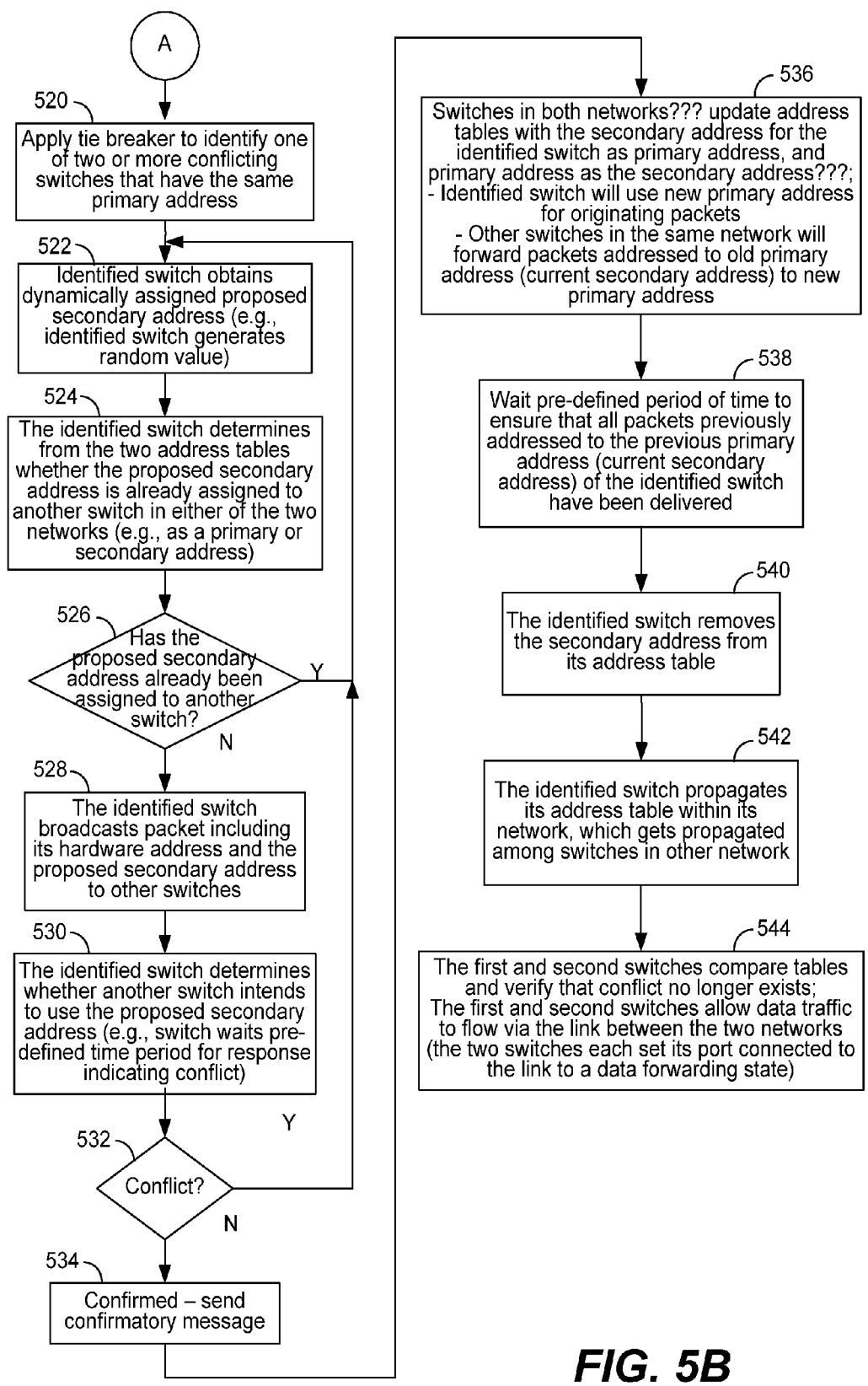

FIG. 5 is a process flow diagram illustrating an example method of merging two or more networks to ensure that potentially conflicting primary addresses associated with switches in the networks being merged are resolved. A first switch of a first network may be physically connected to a second switch of a second network via a link to enable control traffic to flow between the two networks at 502. The first switch in the first network may receive a second address table from the second switch in the second network at 504. The second address table may include hardware identifiers and primary addresses of switches in the second network. The second address table may also include secondary addresses that have been assigned, as will be described in further detail below. The first switch may then propagate the second address table within the first network at 506. The second switch in the second network may also receive a first address table from the first switch in the first network at 508. The first address table may include hardware identifiers and primary addresses of switches and/or other routing identifiers in the first network. The first address table may also include secondary addresses that have been assigned, as will be described in further detail below. The second switch may propagate the first address table within the second network at 510

The first and second switches may independently verify that there are no conflicts between primary addresses and/or other routing identifiers used in the first and second networks by comparing the primary addresses and/or other routing identifiers in the first address table with the primary addresses and/or other routing identifiers in the second address table at 512. If it is determined that there are no conflicts at 514, the first and second switches may allow data traffic to flow via the link between the two networks at 516. For instance, the two switches may each set its port that is connected to the link to a data forwarding state. However, if it is determined that conflicts exist (e.g., a primary address associated with a switch in the first network is the same as a primary address associated with a switch in the second network) at 514, the two switches may not allow data traffic to flow via the link between the two networks until the conflict is resolved as shown at 518.

The conflict may be resolved by replacing the primary address associated with the switch in the first network or the second network with a replacement address. However, rather than abruptly modifying the primary address and losing traffic that has already been sent to the primary address, it is possible to modify the primary address in a manner that enables the traffic that has already been sent to the primary address to be received. This may be accomplished by associating a secondary address with the conflicting switch (and its primary address) in one of the networks (or both of the networks).

In order to determine which switch should change its primary address, a tie breaker may be applied. Thus, a tie breaker may be applied at 520 to identify one of two or more conflicting switches that have the same primary address, where the identified switch is to change its primary address. Specifically, the identified switch may obtain a dynamically assigned proposed secondary address at 522. The proposed secondary address may be obtained via a centralized entity, or may be obtained internally in a distributed manner. For instance, the identified switch may generate a random value to be used as the secondary address. The allocation of the secondary address may follow the scheme described in FIG. 2 for the primary address allocation.

Once the proposed secondary address has been obtained, the identified switch may determine from the address tables whether the proposed secondary address is already assigned to another switch in either of the two networks (e.g., as a primary or secondary address) at 524. If the proposed secondary address has already been assigned to another switch at 526, the process may repeat at 522 to enable the identified switch to obtain another proposed secondary address.

If the proposed secondary address has not already been assigned to another switch, the identified switch may broadcast a packet including its hardware address and the proposed secondary address (and optionally the primary address that has already been provided) to the other switches (in either of the two networks) at 528. In this manner, the "replacement address" may be provided to other switches, enabling packets addressed to the primary address to instead be routed to the replacement address. The identified switch may determine whether another switch intends to use the proposed secondary address based upon whether it receives a response indicating such an intent at 530. For instance, the identified switch may wait a pre-defined time period for a response indicating a conflict between the proposed secondary addresses. If there is a conflict at 532, the process may repeat at 522 to enable the identified switch to obtain another proposed secondary address.

If a conflict no longer exists, the identified switch may send a confirmatory message at 534 to notify other switches of its intent to use the proposed secondary address. For instance, the identified switch may sent its modified address table, which may include the secondary address, the primary address, and the hardware address of the identified switch. Such a notification may be propagated to switches in both networks.

A swap of the primary-secondary address at this time should not cause any problems in the network since both primary and secondary addresses belong to the same switch and the routing metrics in the network should have been updated to include this information. The secondary address may now be used as the (new) primary address, while the primary address may be used as the (new) secondary address. Switches in the networks being merged may update their address tables with the secondary address for the identified switch (where the secondary address is now identified as the primary address), and the primary address (where the primary address is now identified as the secondary address). The identified switch may now use the new (current) primary address for originating packets (e.g., in a source address field of the packets). Other switches in the same network may forward packets addressed to the old primary address (current secondary address) to the new primary address at 536.

The identified switch may wait a pre-defined period of time to ensure that all packets previously addressed to the previous primary address (current secondary address) of the identified switch have been delivered 538. The identified switch may then remove the secondary address from its address table 540 after the period of time has lapsed. In this manner, the association between the secondary address and the primary address may be removed after a predetermined period of time such that the secondary address replaces the primary address. The identified switch may then propagate its modified address table within its network such that the modified address table is propagated among switches in the other network at 542.

The first and second switches may compare the address tables and verify that a conflict no longer exists at 544. Thus, the first and second switches may allow data traffic to flow via the link between the two networks at 544. Specifically, the first and second switches may each set its port that is connected to the link to a data forwarding state.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces including Ethernet, frame relay and ISDN interfaces, for example. Specific examples of such network devices include routers and switches. A general architecture for some of these machines will appear from the description given below. Further, various embodiments may be at least partially implemented on a card (e.g., an interface card) for a network device or a general-purpose computing device.

Figure 6:
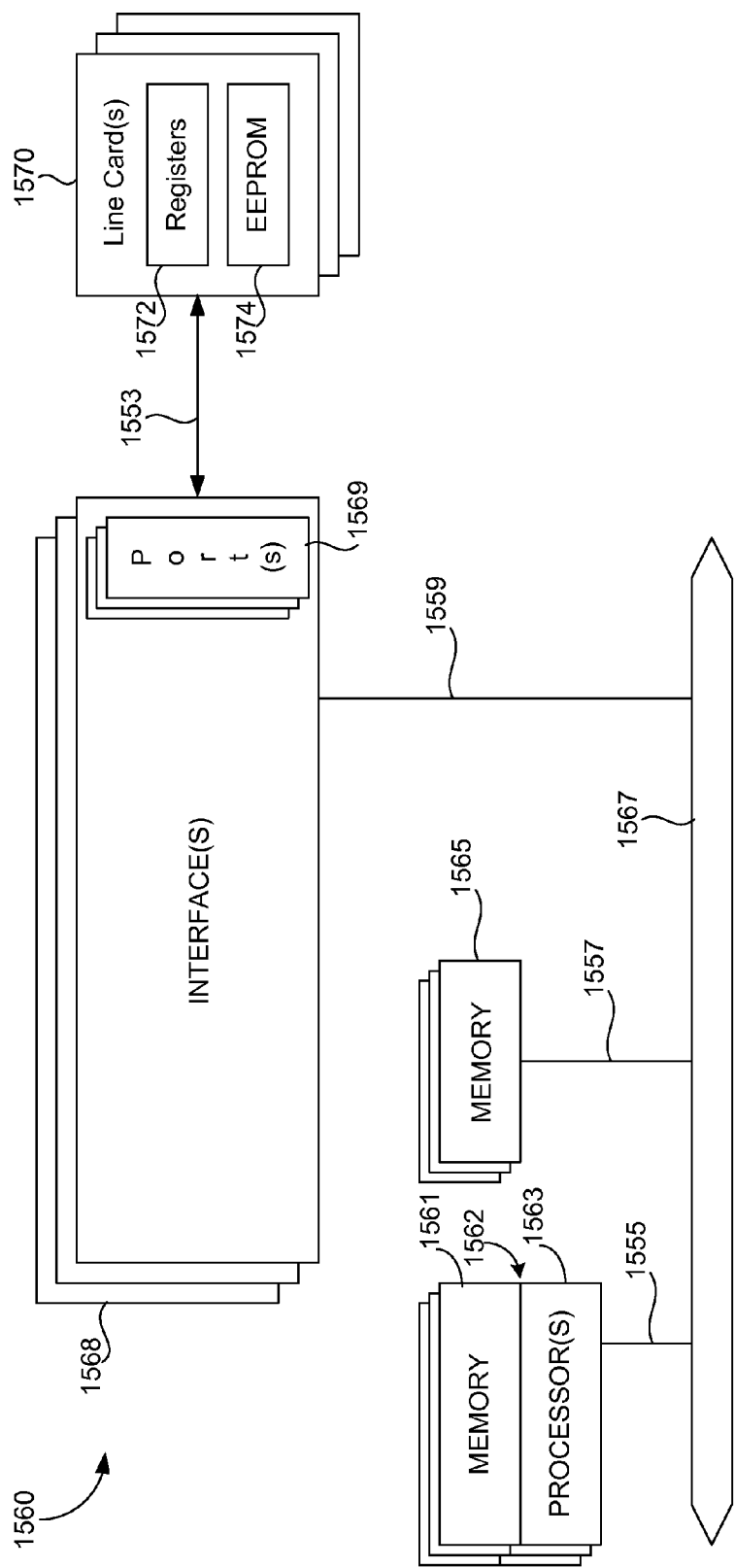
FIG. 6 is a diagrammatic representation of an example network device in which various embodiments may be implemented.

The disclosed embodiments may be implemented at network devices such as switches or routers. Referring now to FIG. 6, a router or switch 710 suitable for implementing embodiments of the invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 10. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets or data segments over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc. Although the system shown in FIG. 6 is one specific router of the present invention, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. For example, the various examples described herein relate to the merging of two networks. However, the disclosed embodiments may also be performed in order to merge more than two networks. In addition, the disclosed embodiments may be performed to resolve conflicts between routing identifiers other than switch identifiers. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   receiving, by a first switch of a first network, a second set of switch addresses associated with a plurality of switches of a second network, wherein the first switch is connected to a second switch of the second network;
   determining, by the first switch, whether a conflict exists between the second set of switch addresses and a first set of switch addresses associated with a plurality of switches of the first network;
   transitioning a conflicting switch address of the first or second set of switch addresses to a non-conflicting switch address based at least in part on the determination of whether a conflict exists between the first set of switch addresses and the second set of switch addresses, thereby allowing the first network and the second network to be merged; and
   merging the first network with the second network.

2. The method as recited in claim 1, wherein a conflict exists between the second set of switch addresses and the first set of switch addresses when a first conflicting address associated with a conflicting switch of the first network is substantially the same as a second conflicting address associated with a conflicting switch of the second network.

3. The method as recited in claim 2, further comprising, when it is determined that a conflict exists between the first set of switch addresses and the second set of switch addresses, creating an association between a secondary address and the conflicting switch of the first network or the conflicting switch of the second network.

4. The method as recited in claim 3, further comprising removing the association between the secondary address and the conflicting switch of the first network or the conflicting switch of the second network after a predetermined period of time, such that the secondary address replaces an address previously associated with the conflicting switch of the first network or the conflicting switch of the second network.

5. The method as recited in claim 2, further comprising, when it is determined that a conflict exists between the first set of switch addresses and the second set of switch addresses, replacing the first conflicting address or the second conflicting address with a replacement address.

6. The method as recited in claim 5, further comprising providing the replacement address to the plurality of switches of the first network or the plurality of switches of the second network, thereby enabling packets addressed to the replaced conflicting address to be routed to the replacement address.

7. The method as recited in claim 1, wherein the first set of switch addresses includes forwarding tags that are uniquely associated with routing paths in the first network, and wherein the second set of switch addresses includes forwarding tags that are uniquely associated with routing paths in the second network.

8. The method as recited in claim 1, further comprising, when it is determined that a conflict does not exist between the first set of switch addresses and the second set of switch addresses, setting a port of the first switch to a data forwarding state, thereby enabling data to flow between the first network and the second network via a link between the first switch and the second switch.

9. The method as recited in claim 1, further comprising, when it is determined that a conflict exists between the first set of switch addresses and the second set of switch addresses, eliminating the conflict.

10. The method as recited in claim 9, wherein eliminating the conflict comprises:
    identifying a conflicting switch address; and
    modifying the conflicting switch address.

11. The method as recited in claim 10, wherein modifying the conflicting switch address comprises:
    associating a modified value with the conflicting switch address; and
    replacing the conflicting switch address after a pre-determined period of time.

12. The method as recited in claim 1, further comprising transmitting, by the first switch of the first network, the first set of switch addresses.

13. A non-transitory computer-readable medium, comprising:
    instructions for determining, by a first switch of a first network, whether a conflict exists between a first set of switch addresses associated with a plurality of switches of a first network and a second set of switch addresses associated with a plurality of switches of a second network, wherein the first switch is connected to a second switch of the second network;
    instructions for transitioning a conflicting switch address of the first or second set of switch addresses to a non-conflicting switch address based at least in part on the determination of whether a conflict exists between the first set of switch addresses and the second set of switch addresses; and
    instructions for merging the first network with the second network.

14. The non-transitory computer-readable medium as recited in claim 13, further comprising instructions for receiving, by the first switch, the second set of switch addresses.

15. The non-transitory computer-readable medium as recited in claim 14, wherein a conflict exists between the second set of switch addresses and the first set of switch addresses when a first conflicting address associated with a conflicting switch of the first network is substantially the same as a second conflicting address associated with a conflicting switch of the second network.

16. The non-transitory computer-readable medium as recited in claim 13, wherein the first set of switch addresses includes forwarding tags that are uniquely associated with routing paths in the first network, and wherein the second set of switch addresses includes forwarding tags that are uniquely associated with routing paths in the second network.

17. An apparatus, comprising:
    a processor; and
    a memory, at least one of the processor or the memory being configured for:
       receiving, by a first switch of a first network, a second set of switch addresses associated with a plurality of switches of a second network, wherein the first switch is connected to a second switch of the second network;
       determining, by the first switch, whether a conflict exists between the second set of switch addresses and a first set of switch addresses associated with a plurality of switches of the first network;
       transitioning a conflicting switch address of the first or second set of switch addresses to a non-conflicting switch address based at least in part on the determination of whether a conflict exists between the first set of switch addresses and the second set of switch addresses; and
       merging the first network with the second network.

18. A method, comprising:
receiving, by a first switch of a first network, a second set of switch addresses associated with a plurality of switches of a second network, wherein the first switch is connected to a second switch of the second network;
determining, by the first switch, whether a conflict exists between the second set of switch addresses and a first set of switch addresses associated with a plurality of switches of the first network; and
enabling data to flow between the first network and the second network via a link between the first switch and the second switch according to the determination of whether a conflict exists between the first set of switch addresses and the second set of switch addresses.

19. An apparatus, comprising:
a processor; and
a memory, at least one of the processor or the memory being configured for:
receiving, by a first switch of a first network, a second set of switch addresses associated with a plurality of switches of a second network, wherein the first switch is connected to a second switch of the second network;
determining, by the first switch, whether a conflict exists between the second set of switch addresses and a first set of switch addresses associated with a plurality of switches of the first network; and
enabling data to flow between the first network and the second network via a link between the first switch and the second switch according to the determination of whether a conflict exists between the first set of switch addresses and the second set of switch addresses.

20. The apparatus as recited in claim 19, wherein the first set of switch addresses include forwarding tags that are uniquely associated with routing paths in the first network, and wherein the second set of switch addresses include forwarding tags that are uniquely associated with routing paths in the second network.

21. The apparatus as recited in claim 19, wherein at least one of the processor or the memory are further configured for setting a port of the first switch to a data forwarding state when it is determined that a conflict does not exist between the first set of switch addresses and the second set of switch addresses.

22. The apparatus as recited in claim 19, at least one of the processor or the memory being further configured for eliminating the conflict between the first set of switch addresses and the second set of switch addresses when it is determined that a conflict exists between the first set of switch addresses and the second set of switch addresses.

23. The apparatus as recited in claim 22, wherein eliminating the conflict between the first set of switch addresses and the second set of switch addresses comprises:
identifying a conflicting switch address; and
modifying the conflicting switch address.

\* \* \* \* \*